Feb. 6, 1940.  G. P. THOMAS  2,189,454
CONDIMENT RECEPTACLE
Filed Oct. 4, 1938
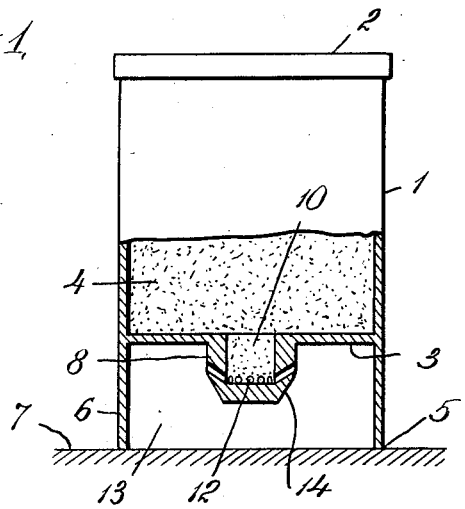
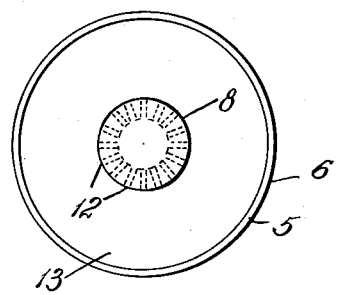
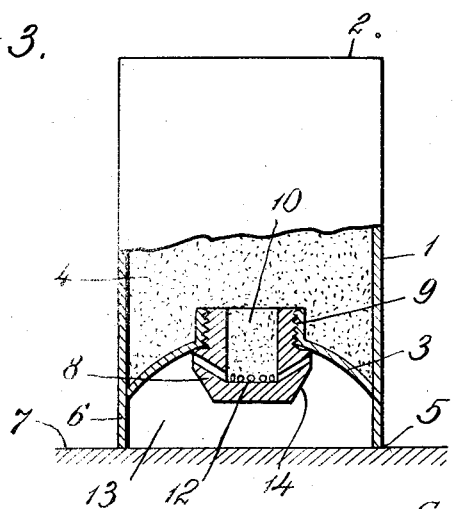
INVENTOR
George Pryse Thomas
BY
Pennie, Davis, Marvin & Edmonds
ATTORNEYS Patented Feb. 6, 1940

2,189,454

UNITED STATES PATENT OFFICE 2,189,454

CONDIMENT RECEPTACLE

George Pryse Thomas, Bayonne, N. J.

Application October 4, 1938, Serial No. 233,143

4 Claims. (Cl. 65—45)

This invention relates to receptacles for granular or pulverulent condiments for table use and has for its object certain improvements in devices or receptacles of that character. The receptacle of the invention is especially intended for the use of such hygroscopic granular material as salt or sugar and is constructed and arranged to prevent the free circulation of air in contact with the material and the resulting absorption of moisture.

The receptacle of the invention comprises a top, side-walls and a bottom enclosing a container for the material and means in or attached to the bottom for distributing or sprinkling the material, and means for excluding the moist air of the surrounding atmosphere, insects, dust and other unsanitary media from contact with the material. In a particularly advantageous embodiment of the invention I construct the side-walls, bottom, and means for sprinkling the material and excluding moisture as integral parts in a unitary structure. The side-walls extend below or depend from the bottom, the lower edge thereof being adapted to engage a table and form a chamber between the depending side-walls, the bottom and the table. The sprinkling means is arranged at or in the bottom and comprises a depression or cell opening directly into the container, and a plurality of upwardly inclined passageways or ducts leading from the cell to the chamber. The aforementioned elements may be separate connected parts and the sprinkling means may be removably attached to the bottom.

The receptacle may be made of any suitable material, such as metal, glass or molded plastic of any desired exterior shape, and the top may be integral with the side-walls or it may be removably attached.

These and other novel features of the invention will be better understood from a consideration of the following discussion taken in conjunction with the accompanying drawing, in which Fig. 1 is a side elevation, partly in section, of a receptacle embodying the invention;

Fig. 2 is a lower end view of the receptacle of Fig. 1; and

Fig. 3 is a side elevation, partly in section, of another form of receptacle embodying the invention.

The receptacle illustrated in the drawing may be of any suitable exterior shape and as illustrated has a cylindrical side-wall 1, top 2, and bottom 3 enclosing the container 4. In Fig. 1 the top is a removable cover and in Fig. 3 the top is integral with the side-walls. The lower edge 5 of the depending side-walls 6 is smooth and straight and adapted to effect a close contact with the table 7 or other support upon which the receptacle rests. The bottom 3 of the receptacle may be flat (Fig. 1), conical or hemispherical (Fig. 3) and is provided with any suitable sprinkling means 8. The receptacle of Fig. 1 has the sprinkling means 8 integral with the bottom 3 and the receptacle of Fig. 3 has the sprinkling means screwed into the threaded opening 9. The sprinkling means has a depression or cell 10 opening into the container 4. The cell is arranged to guide or direct the material from the container into a plurality of passageways or ducts 12. The ducts are relatively small, about one sixteenth of an inch in diameter, being satisfactory for the usual granular salt or sugar, and are preferably radially arranged and extend upwardly from the bottom of the cell to the chamber 13.

The sprinkling means are preferably centrally arranged in the bottom and the passageways or ducts 12 are so sloped upwardly as to prevent the material running out when the receptacle is at rest and are in sufficient number to give the desired distribution or sprinkling of the material when the receptacle is used as hereinafter described. In order that the granular material which is shaken out of the ducts may not stick to the lower outside of the sprinkling means, I prefer to slope the wall or edge 14 inwardly as shown in Figs. 1 and 3.

The receptacle of Fig. 1 may be filled through the top 2 and the receptacle of Fig. 3 may be filled by turning it to an upside-down position from that shown and removing the sprinkling means 8. The condiment to be used, for example, salt or sugar, is poured through the opening 9 into the container 4. After it has been filled the sprinkling device is replaced and the receptacle returned to the position shown in Fig. 3.

As shown in Figs. 1 and 3 the lower edge 5 is in contact with the table or support 7 and air from the surrounding atmosphere is excluded from the chamber 13. The material in the receptacle freely enters the cell 10 and has a tendency to flow a relatively short distance into the ducts 12. While in this position, the air cannot circulate in contact with the material and cause it to become moistened and caked. The material in the ducts is always dry and free running and other contaminating media are also prevented from contacting it.

When it is desired to sprinkle the material, for example, salt or sugar, the container is merely lifted in an upward direction and given a slight swinging or jerky movement at the bottom. This causes the material to flow out of the ducts alternately from one side to the other as the lower part of the receptacle is moved. The material may be sprinkled in extremely small quantities or in relatively large quantities merely by regulating the degree to which the receptacle is moved.

I claim:

1. A receptacle for maintaining hygroscopic granular material in a dry condition and for sprinkling the material which comprises a side-wall, a bottom, said side-wall depending from the bottom, the edge thereof being arranged to engage a table upon which the receptacle rests, a container for the material above the bottom, a chamber formed between the side-wall and the bottom, means in the bottom for sprinkling the material comprising a cell opening directly into the container, a plurality of upwardly extending ducts leading from the cell to the chamber through which the material may pass when the receptacle is shaken.

2. A receptacle according to claim 1 in which the bottom has a central opening, and the sprinkling means is removably attached to the bottom forming a closure for the bottom.

3. A receptacle according to claim 1 in which the ducts are radially disposed with respect to the cell.

4. A receptacle according to claim 1 in which the side wall, bottom and sprinkling means are integral in a unitary structure.

GEORGE PRYSE THOMAS.